United States Patent
Noro et al.

(10) Patent No.: US 6,677,426 B2
(45) Date of Patent: Jan. 13, 2004

(54) MODIFIED EPOXY RESIN COMPOSITION, PRODUCTION PROCESS FOR THE SAME AND SOLVENT-FREE COATING COMPRISING THE SAME

(75) Inventors: Yukio Noro, Yokkaichi (JP); Yoshikazu Kobayashi, Yokkaichi (JP)

(73) Assignee: Resolution Performance Products LLC, Houston, TX (US)

( * ) Notice: Subject to any disclaimer, the term of this patent is extended or adjusted under 35 U.S.C. 154(b) by 0 days.

(21) Appl. No.: 10/145,829

(22) Filed: May 14, 2002

(65) Prior Publication Data

US 2003/0045650 A1 Mar. 6, 2003

(51) Int. Cl.⁷ .................................. C08G 59/50
(52) U.S. Cl. .................. 528/93; 528/106; 528/405; 528/408
(58) Field of Search ................ 528/93, 106, 405, 528/408

(56) References Cited

U.S. PATENT DOCUMENTS 5,021,537 A    6/1991 Stark et al.

FOREIGN PATENT DOCUMENTS

EP    969030    * 1/2000
JP    2000248047    * 9/2000

OTHER PUBLICATIONS

Derwent Abstracts of JP200248047, Sep. 2000.*

* cited by examiner

Primary Examiner—Robert Dawson
Assistant Examiner—D. Aylward
(74) Attorney, Agent, or Firm—Lisa Kimas Jones

(57) ABSTRACT

There is provided a modified epoxy resin composition including a reaction product of an epoxy resin and an alkyl-substituted acetoacetate and a reaction product of an alcohol having at least one hydroxyl group in one molecule and an alkyl-substituted acetoacetate; a production process for the same; and a solvent-free coating using the same. The composition provides a solvent-free epoxy resin composition which has a low viscosity and excellent low-temperature curability.

11 Claims, No Drawings

US 6,677,426 B2

MODIFIED EPOXY RESIN COMPOSITION, PRODUCTION PROCESS FOR THE SAME AND SOLVENT-FREE COATING COMPRISING THE SAME

1. TECHNICAL FIELD TO WHICH THE INVENTION BELONGS

The present invention relates to a solvent-free epoxy resin composition which has a low viscosity and excellent low-temperature curability; gives a cured product having excellent physical properties; and is suitable for such applications as coatings, civil engineering and adhesives, and to a production process for the same and a solvent-free coating comprising the same.

2. BACKGROUND OF THE INVENTION

An epoxy resin has been widely used in such fields as coatings, civil engineering and adhesives because it has superior corrosion resistance, adhesion, chemical resistance and flexibility. Since the epoxy resin is used on the site in many cases in these fields, an ambient-temperature curable material which includes a bisphenol type epoxy resin and an organic polyamine-based curing agent as essential ingredients is generally used in most cases to meet strict requirements including costs. In recent years, use of a low-boiling-point solvent in synthetic resin materials is restricted in consideration of its harmfulness to the human body and the global environment, thereby promoting development and use of a solvent-free material. However, a solvent-free ambient-temperature curable material involves such problems to be solved as poor workability due to a high viscosity of resin, low curing speed at a low temperature in winter and unsatisfactory physical properties of a cured product.

Japanese Patent Application Laid-open No. Sho 48-25099 proposes an epoxy resin modified by an acetoacetic acid ester group. This is aimed to increase the curing speed by introducing an acetoacetic acid ester group to increase the number of functional groups. However, an epoxy resin having a small molecular weight must be used to obtain a modified resin having a low viscosity required to achieve high workability at a low temperature, such a resin inevitably has a small number of hydroxyl groups in the molecule, and therefore a large number of acetoacetic acid ester groups which are functional groups cannot be introduced. As a result, the resin is unsatisfactory in terms of curability at a low temperature as well as viscosity.

U.S. Pat. No. 5,021,537 proposes a resin prepared by mixing a compound obtained by acetoacetylating the hydroxyl groups of a polyhydric alcohol as a reactive diluent with an epoxy resin to reduce viscosity and improve low-temperature curability. However, compared with the reactivity of epoxy groups contained in the epoxy resin, the reactivity of an acetoacetylated diluent component is fast, whereby the cured product becomes non-uniform in structure and therefore inferior in mechanical properties.

It is an object of the present invention to provide a solvent-free epoxy resin composition which has solved the above problems of an epoxy resin; has a low viscosity and excellent low-temperature curability; gives a cured product having excellent physical properties; and is suitable for use in coatings, civil engineering and adhesives as well as a production process for the same.

3. SUMMARY OF THE INVENTION

In view of the above situation, the present inventor has conducted intensive studies and has found that a resin composition having satisfactory curability at a viscosity suitable for use at a low temperature range and excellent mechanical properties, and solving problems hitherto, is obtained by using together a modified epoxy resin prepared by reacting an epoxy resin with an alkyl-substituted acetoacetate to substitute hydroxyl groups contained in the epoxy resin with acetoacetyl groups, and a compound prepared by reacting a polyhydric alcohol with an alkyl-substituted acetoacetate to substitute hydroxyl groups contained in the polyhydric alcohol with acetoacetyl groups. The present inventor has further found that the above object can be attained by a modified epoxy resin composition obtained by reacting an alkyl-substituted acetoacetate with a mixture of an epoxy resin and an alcohol having at least one hydroxyl group in one molecule to acetoacetylate hydroxyl groups contained in the epoxy resin and in the alcohol, and moreover that the resin composition can be produced efficiently in a short period of time. The present invention has been accomplished based on these findings.

Thus, the present invention relates to a modified epoxy resin composition comprising a reaction product of an epoxy resin and an alkyl-substituted acetoacetate and a reaction product of an alcohol having at least one hydroxyl group in one molecule and an alkyl-substituted acetoacetate. Preferably the modified epoxy resin composition has a number average molecular weight of 300 to 1,000, and the melting point of the alcohol is 0° C. or lower, and the viscosity of the alcohol is $\frac{1}{10}$ or less of the viscosity of the epoxy resin at 25° C. The alkyl-substituted acetoacetate is preferably tert-butyl acetoacetate.

There is also provided a process for producing a modified epoxy resin composition, by adding an alkyl-substituted acetoacetate to a mixture of an epoxy resin and an alcohol having at least one hydroxyl group in one molecule to carry out a reaction so as to acetoacetylate hydroxyl groups contained in the epoxy resin and hydroxyl groups contained in the alcohol.

4. DETAILED DESCRIPTION OF THE INVENTION

Examples of the epoxy resin used in the present invention include: bisphenol type epoxy resins such as bisphenol A, halogenated bisphenol A, bisphenol F and bisphenol S; biphenyl type epoxy resin; ester type epoxy resins such as dibasic acid; alicyclic epoxy resins; and terpene diphenol type epoxy resins. Alkyl phenol novolak epoxy resins such as phenol novolak epoxy resin and cresol novolak epoxy resin, and epoxy resin of bisphenol A novolak may also be used. These epoxy resins may be used alone or in combination of two or more thereof. As for processes for producing the above epoxy resins, the epoxy resins are obtained by a direct or indirect process for synthesizing bisphenol A type epoxy resin and bisphenol F type epoxy resin, and the epoxy resins having hydroxyl groups are obtained by reacting an epoxy resin with an aliphatic monocarboxylic acid or by reacting an epoxy resin with a monophenol. The aliphatic monocarboxylic acid is not particularly limited but it is preferably an aliphatic, or animal or vegetable oil fatty acid having 4 to 30 carbon atoms. Illustrative examples of the aliphatic monocarboxylic acid include castor oil fatty acid, tall oil fatty acid, lauric acid, palmitic acid, stearic acid, oleic acid, versatic acid, propionic acid, butanoic acid and pentanoic acid. Tall oil fatty acid and lauric acid which are inexpensive and can be acquired stably are particularly preferred. The monophenol is not particularly limited but it is preferably an alkylphenol having 4 to 20 carbon atoms. Illustrative examples of the monophenol include nonylphenol, p-tert-butylphenol and dodecylphenol. Dialkanolamines such as dimethanolamine and diethanolamine may also be used. These aliphatic monocarboxylic acids and monophenols may be used alone or in combination of two or more thereof. The epoxy resin used in the present invention is preferably an epoxy resin having a number average molecular weight of 300 to 1,000, more preferably a liquid epoxy resin having a number average molecular weight of 300 to 500. Use of an epoxy resin having a number average molecular weight of 1,000 or more makes it difficult to obtain a solvent-free epoxy resin composition having a low viscosity.

Examples of the alcohol having at least one hydroxyl group in one molecule used in the present invention include: linear or branched alcohols such as methanol, ethanol, propanol, neopentyl alcohol, octanol and decanol, as well as ethylene oxide and propylene oxide adducts therewith; and linear or branched low-molecular polyols such as ethylene glycol, propylene glycol, butanediol, pentanediol, hexanediol, octanediol, decanediol, glycerin, trimethylolpropane, trimethylolethane, pentaerythritol, dipentaerythritol and neopentyl glycol, and ethylene oxide and propylene oxide adducts therewith. The polyhydric alcohol is preferably a liquid low-molecular polyol having a large number of hydroxyl groups per mol, a melting point of 0° C. or lower and a viscosity which is 1/10 or less of the viscosity of the epoxy resin, particularly preferably ethylene glycol or propylene glycol. The present invention is aimed to reduce viscosity by combining a reaction product of an epoxy resin and an alkyl-substituted acetoacetate with a reaction product of the above alcohol and an alkyl-substituted acetoacetate, and to improve curing speed by increasing the number of crosslinking sites.

The ratio of the reaction product of an epoxy resin and an alkyl-substituted acetoacetate to the reaction product of an alcohol and an alkyl-substituted acetoacetate is not particularly limited but the optimum effective amount of the latter is desirably 5 to 15 parts by weight based on 100 parts by weight of the former. When the amount of the former is smaller than 5 parts by weight, viscosity and curability become unsatisfactory and when the amount is larger than 15 parts by weight, the physical properties of the obtained cured product deteriorate.

The viscosity of the modified epoxy resin composition of the present invention is preferably 0.1 to 1.0 Pa·s, and more preferably 0.1 to 0.5 Pa·s at 25° C. When the viscosity is higher than 1 Pa·s, a problem of workability arises at a low temperature. Here, a reactive diluent may be added to reduce the viscosity but curability and physical properties deteriorate disadvantageously in this case.

Also, an organic solvent may be used on purpose to reduce the viscosity but it is not preferred from an environmental point of view as described above.

The modified epoxy resin composition of the present invention can be obtained by reacting an alkyl-substituted acetoacetate with hydroxyl groups (secondary hydroxyl group, α-glycol group, phenol, etc.) contained in the epoxy resin and with hydroxyl groups contained in the alcohol at the same time. Examples of the alkyl-substituted acetoacetate include methyl acetoacetate, ethyl acetoacetate, tert-butyl acetoacetate and butyl acetoacetate. Tert-butyl acetoacetate is the most preferred because its reaction speed is fast and a side reaction rarely occurs as it reacts with a hydroxyl group through acetyl ketene unlike an ester exchange reaction of methyl acetoacetate or ethyl acetoacetate. The amount of the alkyl-substituted acetoacetate reacted is not particularly limited but the alkyl-substituted acetoacetate is preferably reacted with 90 mol % or more of the total of hydroxyl groups contained in the epoxy resin and hydroxyl groups contained in the alcohol to obtain a resin having sufficiently high reactivity and a low viscosity.

The modified epoxy resin composition of the present invention may be also obtained by producing a reaction product of an epoxy resin and an alkyl-substituted acetoacetate and a reaction product of an alcohol and an alkyl-substituted acetoacetate separately and uniformly mixing these together. However, it is desired from an industrial point of view that the modified epoxy resin composition be produced by reacting an alkyl-substituted acetoacetate with a mixture of an epoxy resin and an alcohol at the same time.

The reaction between the mixture of an epoxy resin and an alcohol and the alkyl-substituted acetoacetate is preferably carried out in an atmosphere of an inert gas such as nitrogen gas at 50 to 200° C. for 0.5 to 5 hours without using a catalyst, or in the presence of an ester exchange catalyst as desired. Examples of the catalyst include oxides of a metal such as lead☐manganese, magnesium and antimony, metal chloride such as magnesium chloride, acetic acid salts and organic tin compounds. The catalyst is generally used in an amount of 0.01 to 1% based on the alkyl-substituted acetoacetate.

Since an alcohol is formed along with the proceeding of a reaction between the hydroxyl groups and the alkyl-substituted acetoacetate, it is preferably recovered under normal pressure or reduced pressure. The modified epoxy resin of the present invention contains an acetoacetyl group which has been introduced by an exchange reaction between hydroxyl groups contained in the epoxy resin and the alkyl-substituted acetoacetate as follows.

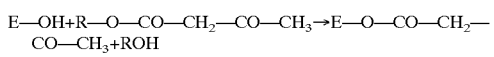

E—OH+R—O—CO—CH$_2$—CO—CH$_3$→E—O—CO—CH$_2$—CO—CH$_3$+ROH (wherein E is an epoxy resin skeleton or polyol skeleton, and R is an alkyl group.)

The modified epoxy resin composition of the present invention shows high reactivity with a curing agent due to two reactive points, namely active methylene group and carbonyl group of acetoacetyl groups introduced into the epoxy resin and into the polyhydric alcohol, and has excellent curability even at a low temperature and a low viscosity. As for a reaction between the acetoacetyl group and the curing agent, it is known that an acetoacetyl group reacts before the epoxy resin in a reaction with an amine-based curing agent and that when an acetoacetyl group is introduced into only either one of the epoxy resin or the alcohol, the curing agent is first reacted with a substance having an introduced acetoacetyl group, thereby causing partial crosslinking and deteriorating mechanical performance. The modified epoxy resin composition of the present invention becomes a cured product having a uniform structure because an acetoacetyl group introduced into the epoxy resin and an acetoacetyl group introduced into the alcohol are crosslinked together by the curing agent and can therefore have not only high curability at a low temperature but excellent physical properties, as well.

Examples of the curing agent used for the curing of the modified epoxy resin composition of the present invention include polyamide amines, epoxy resin amine adducts, aliphatic polyamines, modified polyamines, aromatic amines, tertiary amines, hydrazides, dicyandiamide, imidazoles, acid anhydrides, ketimine, acid terminated polyester resins, phenolic resins, urea resins, resol resins, amino resins, isocyanates and block isocyanates, all of which are used for ordinary epoxy resins. They may be used in combination according to purpose.

Of those, amine-based curing agents are preferred because curing can be carried out at room temperature or at a lower temperature.

The modified epoxy resin composition of the present invention may be mixed with commonly used additives such as: a resin such as xylene resin, petroleum resin, acrylic resin, polyester resin, alkyd resin, polyimide resin and epoxy resin; reactive or nonreactive diluent such as monoglycidyl ethers, dioctyl phthalate, benzyl alcohol and coal tar; filler or pigment such as glass fiber, carbon fiber, silica, aluminum hydroxide, titanium dioxide, carbon black and iron oxide; thickener; thixotropic agent; colorant; flow modifier; catalyst; curing accelerator; antifoamer; antioxidant; and ultraviolet light absorber.

The solvent-free resin composition of the present invention is a composition such as a liquid coating containing substantially no organic solvent.

The principal object of the present invention is to provide a solvent-free resin composition; however, the resin composition thus obtained may be used as a raw material for a solvent type or aqueous type composition.

EXAMPLES

The following examples are provided for the purpose of further illustrating the present invention but are in no way to be taken as limiting the scope of the invention.

Example 1

90 parts by weight of Epikote 828 (manufactured by Japan Epoxy Resins Co., Ltd., bisphenol A type epoxy resin; epoxy equivalent=186 g/eq), 10 parts by weight of ethylene glycol (melting point of −11° C.) and 57 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition A. The evaluation results of the composition are shown in Table 1.

Example 2

90 parts by weight of Epikote 828 (manufactured by Japan Epoxy Resins Co., Ltd., bisphenol A type epoxy resin; epoxy equivalent=186 g/eq), 10 parts by weight of propylene glycol (melting point of −59° C.) and 47 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition B. The evaluation results of the composition are shown in Table 1.

Example 3

90 parts by weight of Epikote 807 (manufactured by Japan Epoxy Resins Co., Ltd., bisphenol F type epoxy resin; epoxy equivalent=169 g/eq), 10 parts by weight of propylene glycol and 47 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition C. The evaluation results of the composition are shown in Table 1.

Example 4

95 parts by weight of Epikote 807 (manufactured by Japan Epoxy Resins Co., Ltd., bisphenol F type epoxy resin; epoxy equivalent=169 g/eq), 5 parts by weight of propylene glycol and 27 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition D. The evaluation results of the composition are shown in Table 1.

Comparative Example 1

100 parts by weight of Epikote 807 (manufactured by Japan Epoxy Resins Co., Ltd., bisphenol F type epoxy resin; epoxy equivalent=169 g/eq) and 6 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition E. The evaluation results of the composition are shown in Table 1.

Comparative Example 2

80 parts by weight of Epikote 807 (manufactured by Japan Epoxy Resins Co., Ltd., bisphenol F type epoxy resin; epoxy equivalent=169 g/eq) and 20 parts by weight of YED216 reactive diluent (of Japan Epoxy Resins Co., Ltd., 1,6-hexanediol diglycidyl ether; epoxy equivalent=155 g/eq) were fed to a 1-liter separable flask having a round bottom and equipped with a thermometer, stirrer, cooling tube, nitrogen introduction port and solvent collector and mixed together under agitation at 80° C. for 30 minutes to obtain an epoxy resin composition F. The evaluation results of the composition are shown in Table 1.

Comparative Example 3

100 parts by weight of Epikote 807 (manufactured by Japan Epoxy Resins Co., Ltd., bisphenol F type epoxy resin; epoxy equivalent=169 g/eq) and 6 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition G.

Separately, 100 parts by weight of propylene glycol and 41 parts by weight of tert-butyl acetoacetate were fed and mixed together under agitation likewise to carry out a reaction at 130 to 140° C. for 1 hour. Thereafter, the by-produced tert-butanol was recovered at 150° C. under normal pressure and reduced pressure to obtain a modified alcohol composition H.

The reaction products G and H produced above were collected and placed in the separable flask in a ratio of 9/1 and mixed together under agitation at 80° C. for 30 minutes to obtain a modified epoxy resin composition I. The valuation results of the composition are shown in Table 1. The production of the modified epoxy resin composition I took about 3 times the time required for the production of the modified epoxy resin C of Example 3.

Comparative Example 4

90 parts by weight of Epikote 807 (manufactured by Japan Epoxy Resins Co., Ltd., bisphenol F type epoxy resin; epoxy equivalent=169 g/eq), 10 parts by weight of trimethylolpropane (melting point of 57° C.) and 41 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition J. The evaluation results of the composition are shown in Table 1.

Comparative Example 5

80 parts by weight of Epikote 807 (manufactured by Japan Epoxy Resins Co., Ltd., bisphenol F type epoxy resin; epoxy equivalent=169 g/eq), 20 parts by weight of propylene glycol and 88 parts by weight of tert-butyl acetoacetate were fed to a 1-liter separable flask having a round bottom and equipped with a thermometer, stirrer, cooling tube, nitrogen introduction port and solvent collector and mixed together under agitation to carry out a reaction at 130 to 140° C. for 1 hour. Thereafter, the by-produced tert-butanol was recovered at 150° C. under normal pressure and reduced pressure to obtain a modified epoxy resin composition K. The evaluation results of the composition are shown in Table 1.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Modified epoxy resin composition | A | B | C | D | E | F | I(G + H) | J | K |
| Blending | | | | | | | | | |
| E828 | 90 | 90 | | | | | | | |
| E807 | | | 90 | 95 | 100 | 80 | | 90 | 80 |
| Ethylene glycol | 10 | | | | | | | | |
| Propylene glycol | | 10 | 10 | 5 | | | | | 20 |
| Trimethylolpropane | | | | | | | | 10 | |
| YED216 | | | | | | 20 | | | |
| Tert-butyl acetoacetate | 57 | 47 | 47 | 27 | 6 | | | 41 | 88 |
| Curing agent | 60 | 58 | 61 | 60 | 47 | 46 | 61 | 60 | 64 |
| Properties of resin | | | | | | | | | |
| Epoxy equivalent (g/eq) | 258 | 247 | 225 | 198 | 163 | 166 | 226 | 224 | 293 |
| Resin viscosity (Pa · s) | 0.51 | 0.83 | 0.42 | 0.89 | 0.295 | 0.45 | 0.45 | 1.55 | 0.21 |
| Curability, physical properties | | | | | | | | | |
| Curability (h) | 3.5 | 3.8 | 3.9 | 4.6 | 7.2 | 12.5 | 4.5 | 3.8 | 2.8 |
| Tensile strength (Mpa) | 52 | 54 | 56 | 57 | 57 | 59 | 48 | 55 | 38 |
| Flexural modulus (Mpa) | 3120 | 3380 | 3400 | 3240 | 3560 | 2530 | 2970 | 3040 | 1420 |
| Production of resin | | | | | | | | | |
| Required time (h) | 3 | 3 | 3 | 3 | 3 | 1 | 9 | 3 | 3 |

(Notes)
The evaluation methods of the resin compositions A to K obtained in Examples and Comparative Examples are as follows.
(1) The epoxy equivalent was measured in accordance with JIS Standard analytical method K7236.
(2) The resin viscosity was measured with an E type rotary viscometer at 25° C.
(3) The curing speed is a half-curing time obtained by applying a clear coating prepared by blending a modified epoxy resin and a curing agent in an equivalent ratio of [epoxy group + active group (acetoacetyl group)]/curing agent = 1/1 to a glass plate by a 3 mil applicator and setting this in an RC type drying time recorder in a 5° C. atmosphere.
The curing agent used was metaxylene diamine Mannich type (active hydrogen equivalent = 78 g/eq).
(4) As for the mechanical properties of the cured product, the clear coating was cast in the same manner as (3) above and left at room temperature for 7 days and a test sample that was cut out from this was measured in accordance with JIS K 7113 and JIS K 7116.
(5) The required time is a total time required for the production of a resin in Examples and Comparative Examples.

As shown in Table 1, the modified epoxy resin composition obtained in accordance with the present invention has a low viscosity and excellent low-temperature curability, gives a cured product having excellent physical properties and is extremely effective for use in coatings, civil engineering and adhesives.

What we claim is:

1. A modified epoxy resin composition comprising a reaction product of an epoxy resin and an alkyl-substituted acetoacetate and a reaction product of an alcohol having at least one hydroxyl group in one molecule and an alkyl-substituted acetoacetate.

2. The modified epoxy resin composition of claim 1, wherein the epoxy resin has a number average molecular weight of 300 to 1,000.

3. The modified epoxy resin composition of claim 2, wherein the melting point of the alcohol is 0° C. or lower, and a viscosity of the alcohol is 1/10 or less of the viscosity of the epoxy resin at 25° C.

4. The modified epoxy resin composition of claim 1, wherein the alkyl-substituted acetoacetate is tert-butyl acetoacetate.

5. The modified epoxy resin composition of claim 1, wherein the viscosity of the epoxy resin at 25° C. is 0.1 to 10 Pa·s.

6. The modified epoxy resin composition of claim 1, wherein the weight ratio of the reaction product of an epoxy resin and an alkyl-substituted acetoacetate to the reaction product of an alcohol having at least one hydroxyl group in one molecule and an alkyl-substituted acetoacetate is 100:5 to 100:15.

7. The modified epoxy resin composition of claim 1, wherein the alkyl-substituted acetoacetate is reacted with 90 mol % or more of the total of hydroxyl groups contained in the epoxy resin and of hydroxyl groups contained in the alcohol.

8. The modified epoxy resin composition of claim 1, further comprising an amine-based curing agent.

9. A solvent-free coating comprising the modified epoxy resin composition of claim 1.

10. A process for producing a modified epoxy resin composition, comprising adding an alkyl-substituted acetoacetate to a mixture of an epoxy resin and an alcohol having at least one hydroxyl group in one molecule to carry out a reaction so as to acetoacetylate hydroxyl groups contained in the epoxy resin and hydroxyl groups contained in the alcohol.

11. The process for producing a modified epoxy resin composition according to claim 10, wherein a reaction between an epoxy resin and an alkyl-substituted acetoacetate and a reaction between an alcohol and an alkyl-substituted acetoacetate are carried out simultaneously.

* * * * *